United States Patent
Boss et al.

(10) Patent No.: US 9,723,128 B2
(45) Date of Patent: Aug. 1, 2017

(54) SYSTEM AND METHOD FOR PROVIDING PROFILE ENHANCEMENT USING SCHEDULING INFORMATION

(71) Applicant: INTERNATIONAL BUSINESS MACHINES CORPORATION, Armonk, NY (US)

(72) Inventors: Gregory J. Boss, Saginaw, MI (US); Brian D. Goodman, West Redding, CT (US); Rick A. Hamilton, II, Charlottesville, VA (US); Johnnye R. L. Tamaru, Reston, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/177,947

(22) Filed: Jun. 9, 2016

(65) Prior Publication Data
US 2016/0295003 A1   Oct. 6, 2016

Related U.S. Application Data

(63) Continuation of application No. 14/549,985, filed on Nov. 21, 2014, which is a continuation of application No. 11/325,492, filed on Jan. 5, 2006, now Pat. No. 9,390,405.

(51) Int. Cl.
G06Q 10/00 (2012.01)
H04M 1/725 (2006.01)
G06Q 10/10 (2012.01)
H04M 19/04 (2006.01)

(52) U.S. Cl.
CPC ...... *H04M 1/72566* (2013.01); *G06Q 10/109* (2013.01); *G06Q 10/1095* (2013.01); *H04M 1/7253* (2013.01); *H04M 19/04* (2013.01)

(58) Field of Classification Search
None
See application file for complete search history.

(56) References Cited

U.S. PATENT DOCUMENTS 4,626,836 A * 12/1986 Curtis ............... G06Q 10/109 283/67
5,070,470 A * 12/1991 Scully ............... G06Q 10/109 708/112
6,016,478 A * 1/2000 Zhang .............. G06Q 10/06314 705/7.19

(Continued)

OTHER PUBLICATIONS

Beigl, M et al. "A Location Model for Communicating and Processing of Context", Personal and Ubiquitous Computing (2002), vol. 6, pp. 341-357.

(Continued)

*Primary Examiner* — Gurkanwaljit Singh
(74) *Attorney, Agent, or Firm* — Lisa Ulrich; Andrew M. Calderon; Roberts Mlotkowski Safran Cole & Calderon P.C.

(57) ABSTRACT

A system and method of enhancing a profile of a portable device. The system and method includes defining an event type in a scheduling tool and scheduling a time to initiate the event type. The system and method further includes associating a notification profile of a device with the defined event type and changing a setting of the device to the notification profile in response to the scheduling time and the defined event type.

20 Claims, 8 Drawing Sheets

(56) References Cited

U.S. PATENT DOCUMENTS

| | | | | |
|---|---|---|---|---|
| 6,085,166 | A * | 7/2000 | Beckhardt | G06Q 10/109 705/7.18 |
| 6,101,480 | A * | 8/2000 | Conmy | G06Q 10/109 705/7.18 |
| 6,388,772 | B1 * | 5/2002 | Williams | G06Q 10/109 358/400 |
| 6,560,655 | B1 * | 5/2003 | Grambihler | H04L 69/329 709/202 |
| 6,678,613 | B2 | 1/2004 | Andrews et al. | |
| 6,760,423 | B1 | 7/2004 | Todd | |
| 6,820,096 | B1 * | 11/2004 | Kanevsky | G06Q 10/109 |
| 6,829,478 | B1 | 12/2004 | Layton et al. | |
| 6,988,128 | B1 * | 1/2006 | Alexander | G06Q 10/109 709/206 |
| 6,999,731 | B2 * | 2/2006 | Cronin | H04M 1/7253 340/7.57 |
| 6,999,993 | B1 * | 2/2006 | Shah | H04L 12/5855 709/207 |
| 7,082,402 | B2 * | 7/2006 | Conmy | G06F 17/211 705/7.13 |
| 7,224,963 | B2 * | 5/2007 | Anderson | H04M 1/72525 340/539.13 |
| 7,369,750 | B2 * | 5/2008 | Cheng | H04N 5/782 348/E7.054 |
| 7,584,278 | B2 * | 9/2009 | Rajarajan | G06F 9/4443 707/999.01 |
| 2001/0014866 | A1 * | 8/2001 | Conmy | G06F 17/211 705/7.19 |
| 2001/0014867 | A1 * | 8/2001 | Conmy | G06F 17/211 705/7.18 |
| 2001/0044903 | A1 * | 11/2001 | Yamamoto | H04L 63/02 726/26 |
| 2001/0049638 | A1 * | 12/2001 | Satoh | G06Q 30/016 705/26.44 |
| 2002/0016729 | A1 * | 2/2002 | Breitenbach | G06Q 10/06 707/802 |
| 2002/0039909 | A1 * | 4/2002 | Rankin | H04M 1/7253 455/558 |
| 2002/0044149 | A1 * | 4/2002 | McCarthy | H04M 1/72563 345/581 |
| 2003/0004773 | A1 * | 1/2003 | Clark | G06Q 10/109 705/7.19 |
| 2003/0028399 | A1 * | 2/2003 | Davis | G06F 19/327 705/2 |
| 2003/0030751 | A1 * | 2/2003 | Lupulescu | H04N 5/44543 348/552 |
| 2003/0046304 | A1 * | 3/2003 | Peskin | G06Q 10/109 |
| 2003/0050038 | A1 * | 3/2003 | Haave | B60R 25/102 455/404.1 |
| 2003/0097561 | A1 * | 5/2003 | Wheeler | G06Q 20/02 713/168 |
| 2003/0100336 | A1 * | 5/2003 | Cronin | H04M 1/7253 455/556.2 |
| 2003/0130882 | A1 * | 7/2003 | Shuttleworth | G06Q 10/109 709/204 |
| 2003/0171973 | A1 * | 9/2003 | Wilce | G06Q 99/00 705/500 |
| 2004/0002958 | A1 * | 1/2004 | Seshadri | G06F 17/30867 |
| 2004/0002972 | A1 * | 1/2004 | Pather | G06F 9/542 |
| 2004/0002988 | A1 * | 1/2004 | Seshadri | G06F 17/30516 |
| 2004/0017300 | A1 * | 1/2004 | Kotzin | G08B 21/0453 340/870.11 |
| 2004/0031035 | A1 * | 2/2004 | Shiu | G06Q 10/10 718/102 |
| 2004/0066300 | A1 * | 4/2004 | Dorenbosch | G04C 10/04 340/636.1 |
| 2004/0078256 | A1 * | 4/2004 | Glitho | G06Q 10/109 709/207 |
| 2004/0093224 | A1 * | 5/2004 | Vanska | G06Q 10/10 713/193 |
| 2004/0107236 | A1 * | 6/2004 | Nakagawa | G06F 17/30581 709/200 |
| 2004/0111315 | A1 * | 6/2004 | Sharma | G06Q 10/0875 709/223 |
| 2004/0111699 | A1 * | 6/2004 | Rockwell | G06Q 10/0875 717/103 |
| 2004/0122721 | A1 * | 6/2004 | Lasorsa | G06Q 10/109 705/7.24 |
| 2004/0125142 | A1 * | 7/2004 | Mock | G06F 9/4443 715/765 |
| 2004/0127197 | A1 * | 7/2004 | Roskind | H04M 1/72566 455/412.2 |
| 2004/0128359 | A1 * | 7/2004 | Horvitz | G05B 19/404 709/207 |
| 2004/0139452 | A1 * | 7/2004 | Hope | G06F 9/542 719/318 |
| 2004/0162882 | A1 * | 8/2004 | Mora | G06Q 10/10 709/207 |
| 2004/0167877 | A1 * | 8/2004 | Thompson, III | G06Q 30/06 |
| 2004/0181315 | A1 * | 9/2004 | Cardinal | A01G 25/167 700/284 |
| 2004/0203644 | A1 * | 10/2004 | Anders | H04M 3/06 455/414.1 |
| 2004/0216168 | A1 * | 10/2004 | Trovato | H04N 7/163 725/135 |
| 2004/0255271 | A1 * | 12/2004 | Lim | H04M 1/72566 717/110 |
| 2005/0020314 | A1 * | 1/2005 | Choi | H04M 1/72566 455/564 |
| 2005/0085272 | A1 * | 4/2005 | Anderson | H04M 1/72525 455/566 |
| 2006/0106806 | A1 * | 5/2006 | Sperling | G06F 8/65 |
| 2006/0116117 | A1 * | 6/2006 | Takase | H04L 63/0407 455/420 |
| 2008/0207263 | A1 * | 8/2008 | May | H04M 1/72566 455/556.2 |
| 2011/0054976 | A1 * | 3/2011 | Adler | G06Q 10/109 705/7.18 |

OTHER PUBLICATIONS

Meng, H. et al, "ISIS: An Adaptive, Trilingual Conversational System with Interleaving Interaction and Delegation Dialogs", ACM Transactions on Computer-Human Interaction (2004), vol. 11, No. 3, pp. 268-299.

Notice of Allowance in related U.S. Appl. No. 14/549,985, dated Mar. 10, 2017, 5 pages.

* cited by examiner

SYSTEM AND METHOD FOR PROVIDING PROFILE ENHANCEMENT USING SCHEDULING INFORMATION

FIELD OF THE INVENTION

The invention generally relates to a system and method for providing profile enhancement to a portable device and, more particularly, to a system and method for providing a notification type to a portable device using scheduling information.

BACKGROUND OF INVENTION

Today's culture is becoming more technology-centric. Traditional lines denoting the bounds of professional and personal portions of our lives are quickly dissolving with the predominance of cellular telephones, pagers, portable digital assistants (PDA), as well as pervasive and remote e-mail systems. These devices and systems provide the technologies for remote access and/or notification for an end user.

These devices and systems (hereinafter referred to as portable devices) are technical advances that provide many benefits, but can also be distractions to the user as well as to others in the vicinity. For example, users, such as doctors and information technology staff, who spend time "on call", for example, are able to enjoy the ability to be connected while at a remote location. This provides the user with many advantages such as, for example, the ability to travel without the worry that an important telephone call or email will be missed.

However, considerate and proper use of these devices often necessitates that their operating mode be changed to reflect the user's current environment. As an example, during a meeting, it is generally considered best to change the notification profile of a cellular telephone from audio notification (e.g., ring) to physical notification (e.g., vibration mode) to reduce the disruption of an incoming call to others within the meeting. Furthermore, most users have experienced ringing telephones during other inopportune times such as in a movie or restaurant, as well as having missed calls when the cellular telephone has been left on vibrate.

While it is true that most cellular telephones, pagers and other portable type devices have the ability to be changed from audio to physical notification (i.e., modified to vibrate instead of beep using a profile defined on a portable device), doing so requires that the user manually induce both the initial setting (i.e., from ring to vibrate) and back to the original notification setting (i.e., from vibrate to ring) as the environment changes for the user. Changing a notification profile of a portable device is not overly complicated, but the user can easily forget to change the notification profile, leading to unnecessary, avoidable disruption to others or missed calls, emails, pages, etc. Making such manual changes can be time consuming and, to a certain extent, may still be complicated for the unsophisticated user. For example, in some applications, the user may have to navigate through many scroll-down windows, options, etc., merely to change the profile from "ring" to "vibrate".

Accordingly, there exists a need in the art to overcome the deficiencies and limitations described hereinabove.

SUMMARY OF THE INVENTION

In a first aspect of the invention, a method includes defining at least one event type in a scheduling tool and scheduling a time to initiate the event type. The method further includes associating at least one notification profile of a device with the defined event type and changing a setting of the device to the notification profile in response to the scheduling time and the defined event type.

In another aspect of the invention, the method includes selecting an event type in a calendar tool and associating a notification profile to the selected event type. The method further includes scheduling a time for the event type to take place in the calendar tool and changing a notification method of a portable device with the notification profile in response to the scheduled event type and the selected event type.

In another aspect of the invention, a system comprises a calendar tool containing data associated with at least one or more event types and notification profiles, and at least one of a hardware and software component for setting an event type of the one or more event types to a scheduled time. The hardware and/or software component associates the event type with a notification profile of the one or more notification profiles and initiates a change of a notification method in a portable device to the notification profile in response to the scheduled event.

In another aspect of the invention, a computer program product comprising a computer usable medium having readable program code embodied in the medium includes at least one component to implement the method(s) of the invention.

In another aspect of the invention, a process for integrating computing infrastructure, comprises integrating computer-readable code into a computer system, wherein the computer system comprises a computer usable medium, wherein the computer usable medium comprises a profile notification enhancement, and wherein the code in combination with the computer system is capable of performing the method(s) of the invention.

DETAILED DESCRIPTION OF EMBODIMENTS OF THE INVENTION

The invention is directed to a system and method for providing and/or modifying a notification profile (e.g., ring type) of a portable device in response to a calendared event using a scheduling tool. In embodiments, the system and method of the invention allows a user to change or modify a profile of a portable device using a calendar or scheduling tool such as, for example, Lotus Notes. This can be performed remotely using a workstation (e.g., a computer) and any known network technology such as, for example, CDMA, infrared linking, etc. It is also contemplated that the portable device may be programmed without the use of a workstation, in the case that the portable device has an internal calendar or scheduling tool, for example. With use of the invention, it is now possible to permit the automation of changes to notification profiles, e.g., ringing, etc., of a portable device by using calendar tools as specified by the end user's calendar events. This will result in smooth and non-disruptive changes in the notification profile of the portable device to reflect a change in the end user's environment which, in turn, will reduce the device management burden to the end user.

Figure 1A:
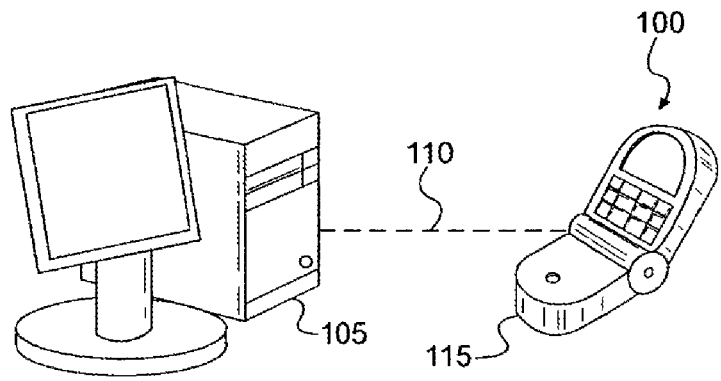
FIGS. 1a and 1b are diagrams of embodiments in accordance with the invention.

FIG. 1a is a block diagram of an embodiment of the invention, generally denoted by reference numeral 100. The components of FIG. 1a may be used to implement the processing of the invention, as discussed more fully below. In one embodiment, the invention includes at least one user workstation 105 (i.e., a computer for a user, a workstation, or client workstation) which typically has a memory device (for example, a hard drive, DVD drive, or the like), processor and accompanying components, all well known to those of skill in the art. The user workstation 105 additionally includes a scheduling and/or calendar tool such as, for example, Lotus® Notes or MicroSoft™ Calendar. The user workstation 105 may be connected via a network 110 (e.g., a local area network (LAN), a wide area network (WAN), wireless network, IR, or the Internet, to name but a few) to a portable device 115. The portable device 115 may be, for example, a cellular telephone, portable digital assistant, pager, BlackBerry™ or other communication device. It should be recognized that the workstation and the portable device may be representative of the same or different users.

Figure 1B:
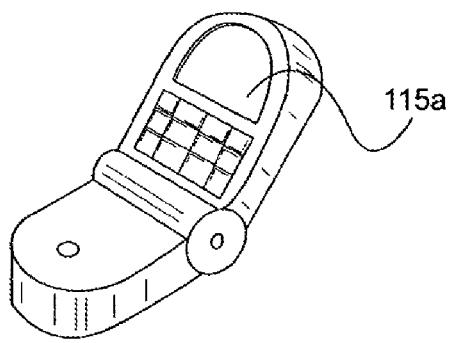

FIG. 1b shows a cellular telephone or other portable device (e.g., PDA) 115, which includes a graphical user interface 115a. The GUI 115a allows a user to accept, decline or modify a notification profile which was provided via the workstation 105. Alternatively, the GUI 115a allows the user to directly change the notification profile of the portable device 115 based on an event occurrence, without the need for the workstation 105 or network 110, in general. In such instances, the portable device 115 will have a scheduling and/or calendar tool, which includes an option to change a notification profile based on a calendar event.

Figure 2:
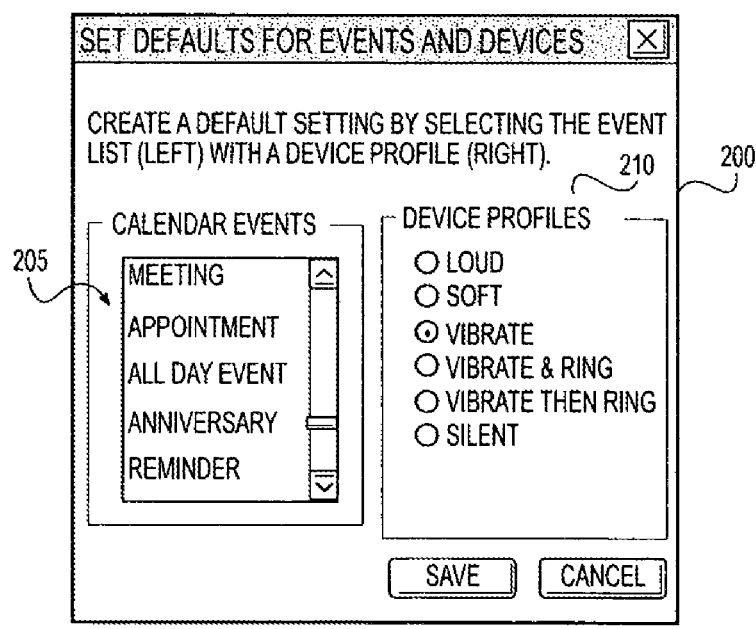
FIG. 2 is a representation of a graphical user interface (GUI) implementing an embodiment of the invention.

FIG. 2 is a representative illustration of a graphical user interface (GUI) implementing an embodiment of the invention. In the representation of FIG. 2, the GUI is generally denoted as reference numeral 200. The GUI 200, in one aspect of the invention, provides a mechanism for setting defaults for event types and notification profiles (also referred to as settings or device profiles) of the portable device 115. The GUI 200 of FIG. 2 may be implemented on the workstation 105 or the portable device 115, itself, or both, depending on the particular application. By way of illustration, the GUI 200 of FIG. 2 may be provided on the workstation 105 to set notification profile defaults of a cellular telephone, in the absence of a calendar tool loaded on the cellular telephone.

As shown in the example of FIG. 2, the GUI 200 includes a list of calendar events 205 and device or notification profiles (e.g., settings) 210. The calendar events 205 may include, for example, meeting;
appointment;
all day event;
anniversary; and
reminder.

It should be understood that the above list of calendar events is merely representative of events that may be preprogrammed into the calendar or scheduling tool. Accordingly, the above list should not be considered exhaustive of all calendar events, and is provided as an illustrative example of most common calendar events used in a calendar or scheduling tool.

The profiles 210 may be associated to any of the above calendar events. For example, the profiles, e.g., settings, may include:

loud (e.g., ring at a predetermined decibel level);
soft (e.g., ring at a predetermined decibel level);
vibrate;
vibrate and ring;
vibrate then ring; and
silent.

In one example, the notification profile of "vibrate" may be associated to the event of "meeting", as discussed more fully below. It should be understood that the above list is representative of notification types (e.g., device settings) that may be used with a portable device 115 such as a cellular telephone. Accordingly, the above list should not be considered exhaustive of all types of settings used with different portable devices. Other notification types may be visual cues such as backlighting, blinking, etc.

Still referring to FIG. 2, in implementation, a user may associate one of the calendar events 205 with the notification profiles 210. This can be accomplished by highlighting a calendar event, e.g., meeting, and selecting a notification profile, e.g., silent. In this manner, when a user opens the calendar tool, for example, and selects a calendar event of "meeting", the default option for the device setting will be "silent".

Figure 3A:
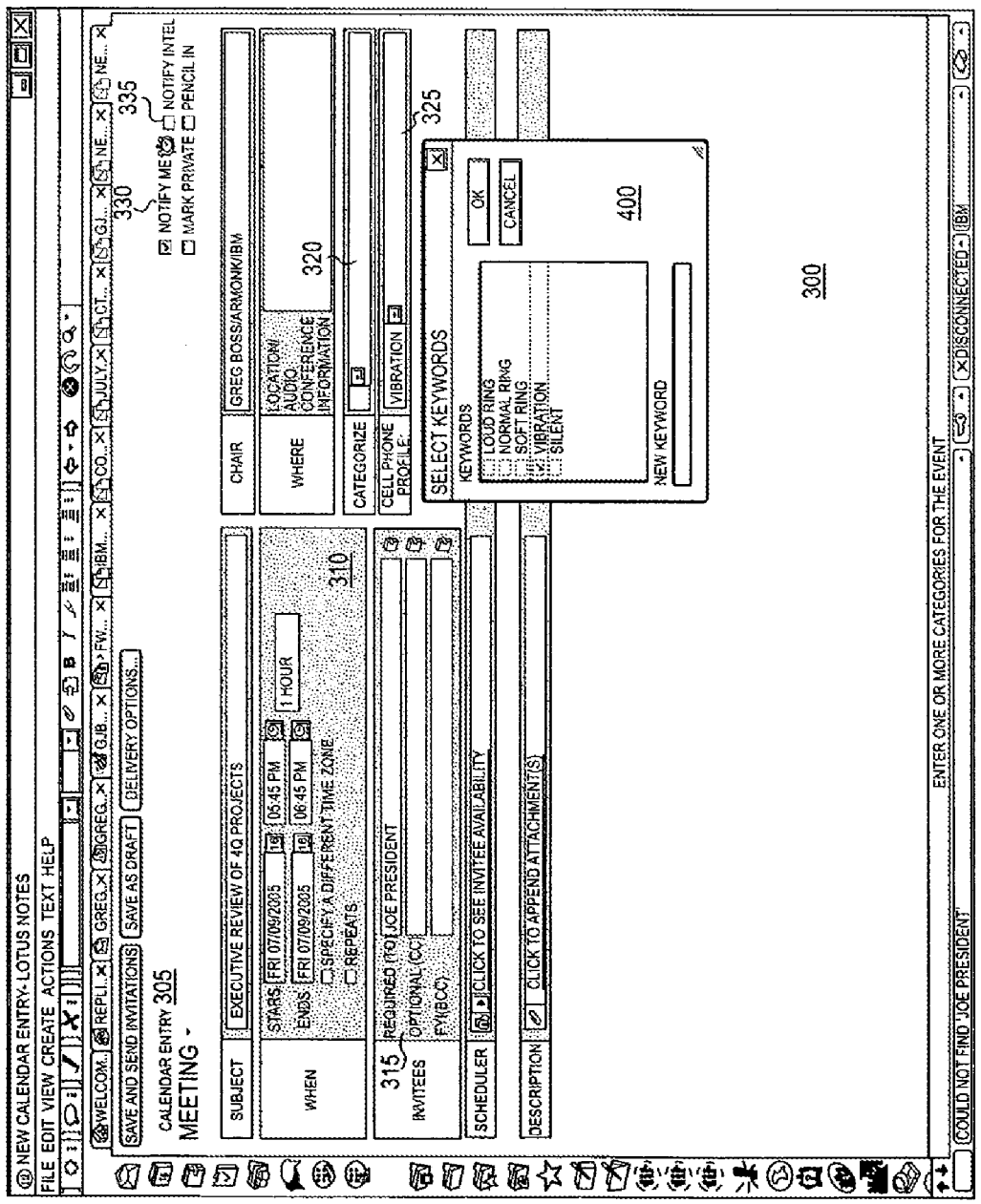
FIG. 3a is a representation of a GUI implementing an embodiment of the invention.

FIG. 3a is a representation of a Lotus Notes GUI implementing an embodiment of the invention. The GUI of FIG. 3a may equally be any known calendar or scheduling tool, implemented on either the workstation 105 or the portable device 115, itself. The GUI, shown generally as reference numeral 300, includes several fields, including a calendar event field 305, appointment entry field 310, invitee field 315, categorize field 320, profile field 325 and notify fields 330 and 335, amongst others. The calendar event field 305 may include the calendar events, as discussed above with reference to FIG. 2.

In the example of FIG. 3a, the calendar event field 305 is populated with a "meeting" event. In one aspect of the invention, the default for "meeting" event is "vibration", which may have been previously set as a default using the GUI of FIG. 2, for example. In further embodiments of the invention, the user can override the default by use of the fields shown in the window 400. This is provided by selecting the notification profile field 325, and thereafter selecting the desired notification profile, e.g., "vibration". Alternatively, if no default was provided, the user can use the fields in window 400 to set the notification profile. In the window 400, profiles include, as an illustrative example, (i) loud ring, (ii) normal ring, (iii) soft ring, (iv) vibrate, and (v) silent.

Figure 3B:
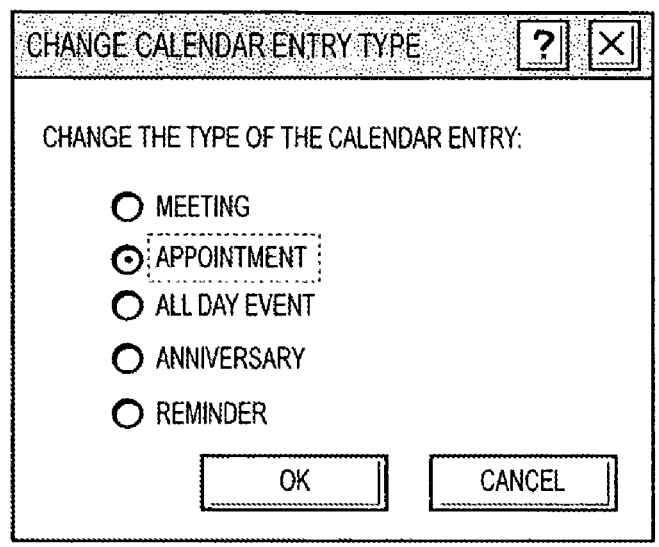
FIG. 3b is a representation of a GUI implementing an embodiment of the invention.

Still referring to FIG. 3a, the calendar event field 305 may include a scroll down window or a window, as shown in FIG. 3b. In either scenario, the user has the option of choosing between many different events. These events may include, for example, meeting, appointment, all day event, anniversary, and reminder, to name a few. The appointment entry field 310, invitee field 315 and categorize field 320 are all well known fields, not requiring explanation herein. The user also has the opportunity to define or select the portable device, using for example the option 325.

It should be recognized that the user can define many different portable devices for notification during a same or different log on session, even selecting different notification profiles and protocols for each device. For example, the user may select both a cellular telephone and a pager, via option 325. With the pager, the user can select the vibrate mode; whereas, with the cellular telephone, the user can select blinking LED, as one example, via option 400. This provides added flexibility across different devices which may be used by the user, sender and/or recipient.

In addition, the GUI of FIG. 3*a* may include a notify field for different users, at reference numeral 335. In one implementation, a first user may set a calendar event which involves several parties. In use, the first user would select the notify option 335 which, in turn, may be used to send a notification profile change or request to any or all of the parties associated with the calendar event. By way of example, "A" sets a calendar event which involves "B" and "C". "A" may request a notification change to the portable device of "B" and "C". Due to the flexibility of the system, "A" may select different portable device types and notification profile changes to "B" and "C", depending on the specific devices and preferences which are used by the users, "A" and "B". The system and method of the invention is further capable of sending different protocols to activate the specific devices, depending on the specific requirements of the device.

The notify field 330 (and 335) of FIG. 3*a* may have different functions, depending on the particular application provided by the service provider, all of which are contemplated herein. The following are illustrative examples, implementing the notification scheme of the invention.

1. Selecting the notify field: In this embodiment, by selecting the notify field, the calendar or scheduling tool automatically notifies the user of an upcoming event and change of notification profile. This provides the user with the opportunity to accept, decline or modify the upcoming event or notification profile, via options on the portable device, itself.

2. Not selecting the notify field: In this embodiment, by not selecting the notify field, the system and method of the invention will not notify the user; however, the notification profile will automatically change based on an upcoming event.

3. Not selecting the notify field: In this embodiment, by not selecting the notify field 330, the system and method will not make any changes to the portable device, despite a scheduled event.

In one aspect of the invention, the end user may define the portable device, notification profile for the selected device, and communication protocol to the calendar or scheduling tool. Additionally, the end user, or by default, the calendar or scheduling tool, itself, can download or load, respectively, the notification profiles for that device. As an example, the notification profiles may be downloaded from the portable device or remote server over a network, IR, or other communication mechanism. As discussed above, the notification profiles may include soft audible ring, medium audible ring, loud audible ring, silent, vibrate, or a visual cue such as a backlight blink or an LED blink, alone or in any combination with the above, to name but a few.

The communication method may include, for example, SMS (Short Message Service) or email. In the case of email, an executable attachment may be sent to the portable device in order to (i) prompt or initiate the portable device to send the required notification profiles to the calendar or scheduling tool or (ii) initiate the change in the notification profile. The message may also be an email message in a format which can be interpreted by the agent on the device to perform (i) and (ii), above.

In a further alternative example, an executable program or code may be resident on the portable device and, as such, upon receipt of a request to change the notification profile, the portable device will initiate such change automatically. These implementations may be performed for each portable device specified in the calendar or scheduling tool. In further embodiments, a password, encryption scheme or digital signatures, certificate or other identifier may be implemented for security purposes, thereby reducing the ability to corrupt the portable device from an unauthorized source. In this implementation, the system will identify, trust or distrust a digital signature, certificate or other identifier to initiate the changing of the at least one notification profile.

Figure 4A:
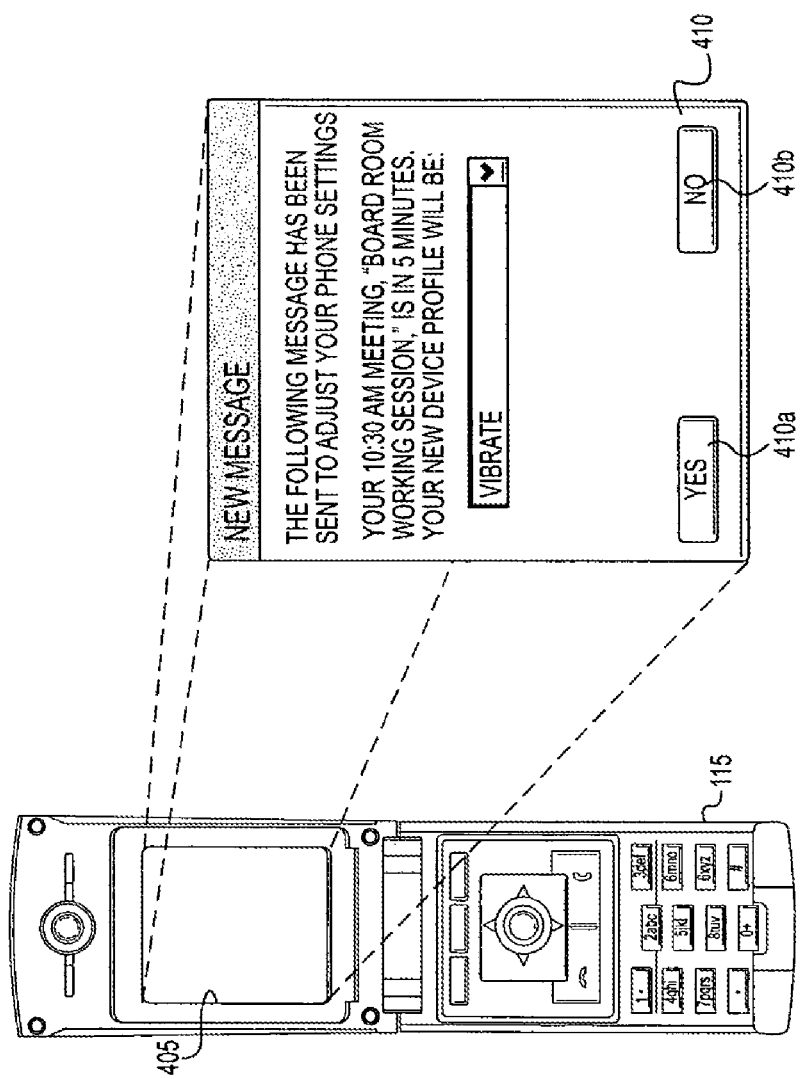
FIG. 4a is a representation of a cellular telephone and accompanying GUI implementing an embodiment of the invention.

FIG. 4*a* shows a cellular telephone with an illustrative GUI, implementing the invention. The cellular telephone 115, in the example of FIG. 4*a*, includes a viewing screen 405 capable of displaying a message window 410. The message window 410 includes a notification message received from the calendar or scheduling tool which, in one implementation, may include the event type, time and particulars, as well as a notification that the notification profiles will be adjusted in response to the upcoming event. The user has the ability to accept or decline the notification profile by either selecting a "yes" button 410*a* or a "no" button 410*b*.

Figure 4B:
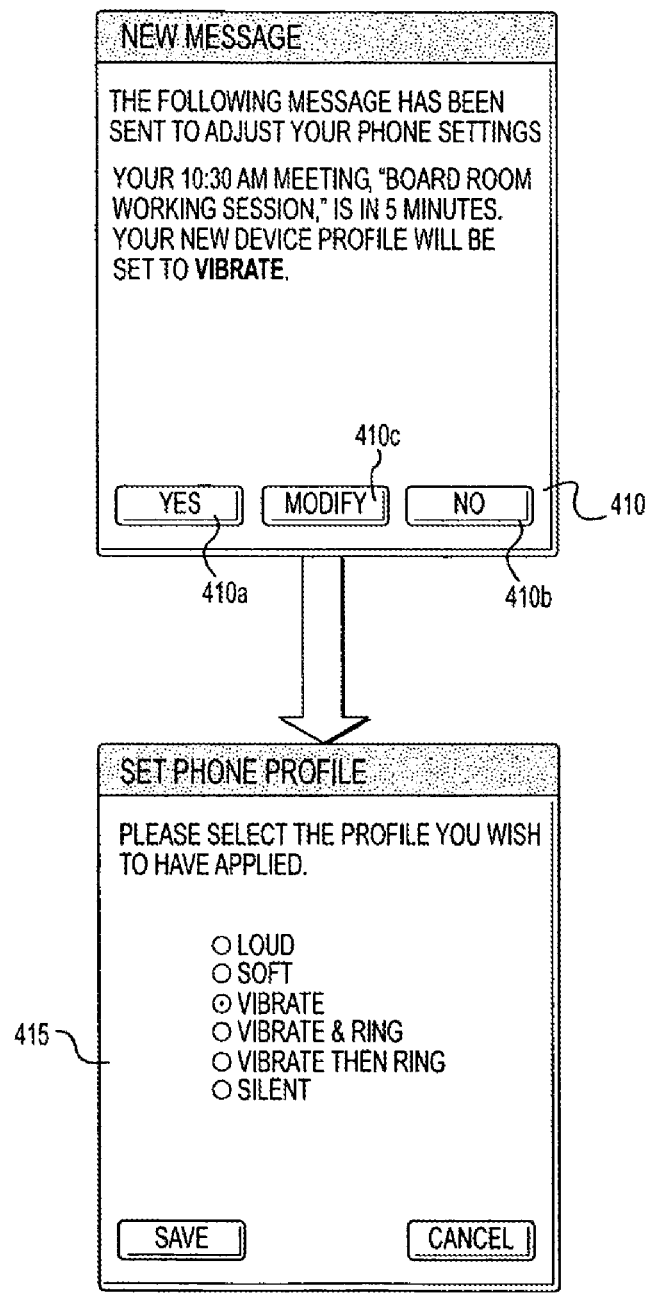
FIG. 4b is a representation of a cellular telephone GUI implementing an embodiment of the invention.

FIG. 4*b* shows an alternative embodiment of a message window 410. In this embodiment, in response to a received notification, the user has the ability to accept, decline or modify the setting by selecting the "yes" button 410*a*, "no" button 410*b* or "modify" button 410*c*, respectively. By selecting the modify button 410*c*, a window interface 415 will appear allowing the user to modify the notification profile for the particular event. The user may also be given options to define the "on" and "off" time periods which will denote when calendar tool is to control the portable device.

Figure 5:
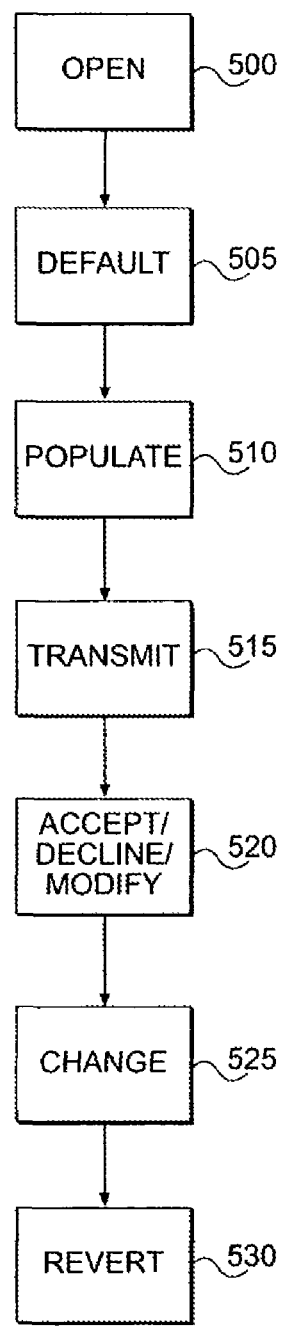
FIG. 5 is a flow chart implementing steps in accordance with an embodiment of the invention.

FIG. 5 is a flow diagram implementing steps of the invention. FIG. 5 may equally represent a high-level block diagram of the invention. The steps of FIG. 5 may be implemented and executed from either a server, in a client server relationship, or they may run on a user workstation with operative information conveyed to the user workstation to create the navigation outlined above. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-RAY) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

In another embodiment, the invention provides a business method that performs the process steps of the invention on a subscription, advertising, and/or fee basis. That is, a service provider, such as a Solution Integrator, could offer to provide notification profiles to a user. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Referring back to FIG. 5, at step 500, a user opens the calendar or scheduling tool, either on a workstation, remote server, or a portable device. The user, at optional step 505, may set a default for the notification profile for specific event types. At step 510, the user populates the many different fields of the calendar or scheduling tool including, amongst other features, the event type, notification profile type (if not set as a default), and if applicable, the notification field. At step 515, at the onset or prior to the scheduled event, an email, SMS or other transmission will be provided to the portable device, and if the notification field has been selected, the user will be notified prior to a change of the notification profile type. (This step may be eliminated if the user is using the scheduling tool of the portable device.) The notification type may be a silent notification, reminding the user of the change or, alternatively, initiating the change automatically.

The user, at optional step 520, may accept, decline or modify the change to the notification profile type. At step 525, if accepted or modified, the notification profile of the portable device is changed. At step 530, if appropriate, after the event type has expired, the notification profile will revert back to the original setting. In one further contemplated embodiment, the calendar or scheduling tool may be synchronized with the portable device. In this implementation, the portable device will be updated on a regular basis, in any well known manner.

Example of Use

By way of one specific illustration, upon an occurrence of a scheduled meeting, the calendar tool may send a message to the portable device which contains the desired notification profile. This may be transmitted, for example, using the SMS protocol/format. The receipt of this message will, in turn, result in an automated change to the appropriate notification profile as specified in the received message, via any of the methods described herein. In one implementation, by selecting the notify field, an alert, e.g., silent alert, may be provided to the end user by the portable device as a notification of the change of notification profile.

In a more specific example, referring to the GUI of FIG. 3*a*, the user would populate the required fields. For example, the user would indicate a meeting event on Jul. 9, 2005 at 5:45 PM with an end time of 6:45 PM. The user would select the notify the end user function, and request a change of the notification profile type to vibrate. The user may also identify one or more portable devices and, if appropriate, the communication mode for each.

Upon the occurrence of the event, a message will be sent to the cellular telephone at or prior to the scheduled start of the event, e.g., Jul. 9, 2005 at 5:45 PM, to instruct the user's (receiver's) cellular telephone to change from "ring mode" to "vibrate only mode". If accepted, the cellular telephone will remain in "vibrate only mode" until the cellular telephone receives another message at 6:45, at which time, the event is scheduled to be completed. At this time, the system and method of the invention will instruct the cellular telephone to return to its default notification profile, or alternatively to another scheduled notification event profile. In an alternative example, the ending time may be transmitted along with the beginning time of the scheduled event to allow the notification profile to revert to its original setting, thus eliminating the need for an additional transmission.

If there is another event following the current event in the calendar, the calendar or scheduling tool can similarly send a message initiating the notification profile of the next event based on profile of the next event; whereas, if there is no event following the current event, a message can be sent initiating a change to the default setting. Either notification message may also result in a silent notification by the portable device of the change to the user, in order to accept, decline or modify the notification profile request.

In this example, as should now be understood, the user for each portable device should define the portable device(s) to the calendar tool, in addition to populate (e.g., changing) the notification profiles for that device, defining the event type along with the desire to be notified, if requested. The user may also be given options to define the "on" and "off" time periods which will denote when the calendar or scheduling tool is to control the portable device. Thus, the calendar or scheduling tool is capable of sending a message to the portable device to initiate a change in the notification profile based on the event type specified by the user.

When the change of notification profiles is automated, initiated and controlled by a calendar system, this will reduce the overhead required for portable device management as the user no longer has to remember to set and unset the notification profile of the portable device. It also improves life quality for others involved in the event as there will be fewer disruptions due to inappropriate ringing.

Figure 6:
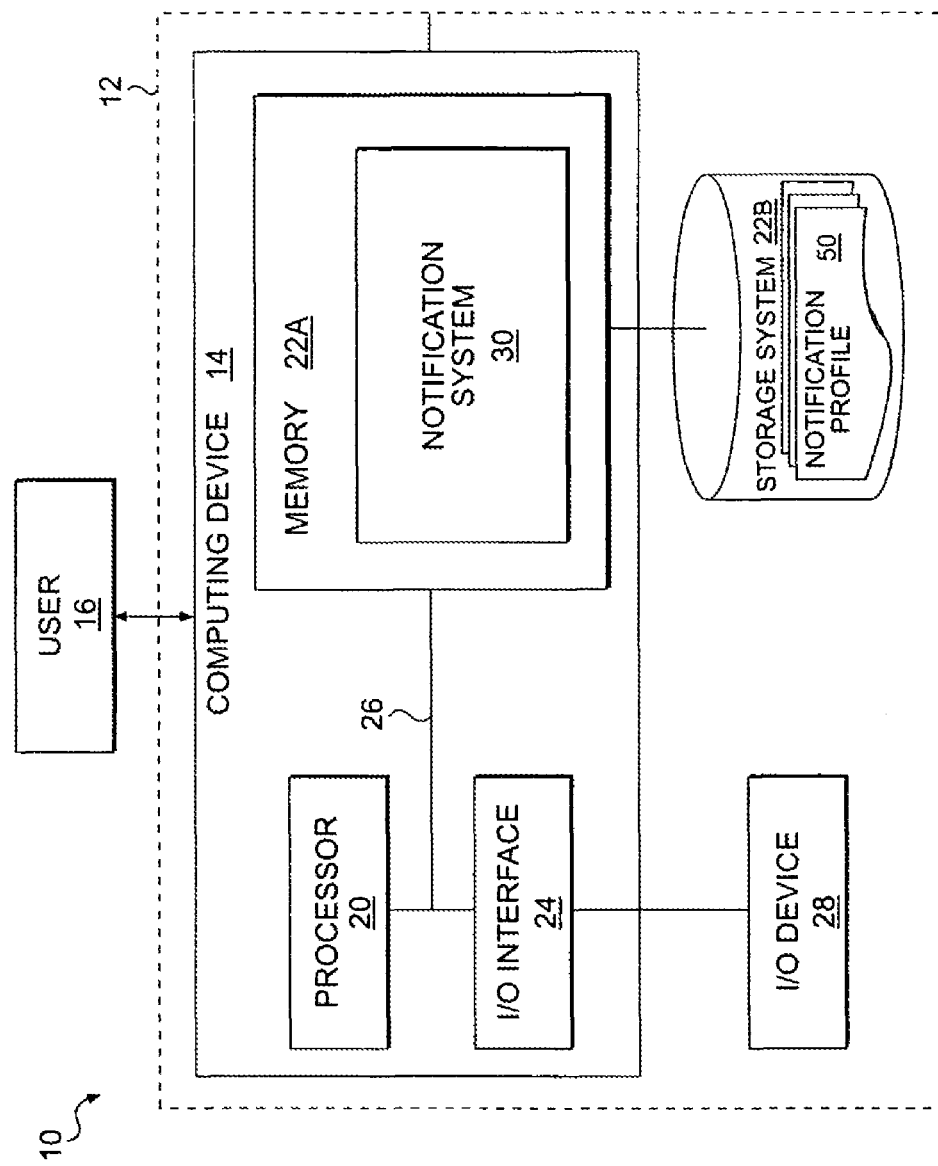
FIG. 6 shows an illustrative environment for implementing the steps in accordance with the invention.

FIG. 6 shows an illustrative environment 10 for managing the processes in accordance with the invention. To this extent, the environment 10 includes a computer infrastructure 12 that can perform the processes described herein, which is accessible by a user 16. In particular, the computer infrastructure 12 is shown including a computing device 14 that is operable to perform the notification system 30 and related functionality thereof. The computing device 14 is shown including a processor 20, a memory 22A, an input/output (I/O) interface 24, and a bus 26. Further, the computing device 14 is shown in communication with an external I/O device/resource 28 and a storage system 22B. The set of notification profiles 50 can be stored in the storage system 22B. As is known in the art, in general, the processor 20 executes computer program code, which is stored in memory 22A and/or storage system 22B. While executing computer program code, the processor 20 can read and/or write data, such as data associated with the notification system 30, to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

In any event, the computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in other embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in one embodiment, the computer infrastructure 12 comprises two or more computing devices (e.g., a server cluster) that communicate over any type of communications link, such as a network, a shared memory, or the like, to perform the process described herein. Further, while performing the processes described herein, one or more computing devices in the computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols. As discussed herein, the notification system enables the computer infrastructure 12 to manage the set of notification profiles 50 and related information.

While the invention has been described in terms of embodiments, those skilled in the art will recognize that the invention can be practiced with modifications and in the spirit and scope of the appended claims.

What is claimed is:

1. A computer-implemented method, comprising:
defining at least one event type in a scheduling tool of a workstation;
scheduling a time to initiate the at least one event type in the scheduling tool;
associating at least one notification profile of a device with the defined at least one event type; and
changing, by a hardware device using a processor, a setting of the device to the at least one notification profile in response to an occurrence of the scheduling time, wherein the changing is performed by sending an executable attachment from the workstation to the device which, when executed, changes the setting, and prior to changing the setting, notifying a user of the changing of the setting and providing an opportunity for the user to accept or deny the changing setting.

2. The method of claim 1, wherein the at least one event type is defined at least as a meeting, appointment, all day event, anniversary or reminder.

3. The method of claim 1, where the at least one notification profile is at least one of a ring at a predetermined decibel level, vibrate, vibrate and ring, vibrate then ring, visual cue or combination therein.

4. The method of claim 1, wherein the changing coincides with the scheduling time of the defined at least one event type.

5. The method of claim 1, wherein initiating the changing of the setting is further based on receiving a digital signature, certificate, or other identifier.

6. The method of claim 1, wherein the changing a setting of the device is performed for more than one device or event types.

7. The method of claim 6, wherein at least one of the defining and changing are performed for different devices of the one or more device and further comprising using a different, same or combination thereof protocol for each of the different devices.

8. The method of claim 1, further comprising accepting, declining or overriding the changing of the at least one notification profile, after the notifying step.

9. The method of claim 1, further comprising transmitting a signal from a remote location, having the scheduling tool, to initiate the changing of the setting.

10. The method of claim 9, wherein the transmitting is implemented and utilized at least one of infrared, SMS and over a network.

11. The method of claim 1, further comprising synchronizing the scheduling tool with the device, wherein the defining the at least one event type in the scheduling tool includes synchronizing with the device.

12. The method of claim 1, further comprising providing the scheduling tool on at least one of a remote workstation and the device.

13. The method of claim 1, wherein the scheduling tool initiates the changing of the setting of the device at an onset of the scheduled event type.

14. The method of claim 1, further comprising defining the at least one notification profile of the device and communication protocol to the scheduling tool.

15. The method of claim 14, wherein the defining of the at least one notification profile is downloaded from at least one of the device and a remote server.

16. The method of claim 14, wherein the changing of the setting is initiated by the sending the executable attachment to the device and causing the device to execute the executable attachment upon the occurrence of the scheduling time and based on the device receiving user input accepting the changing setting, the method further comprising keeping the setting unchanged based the device receiving user input denying the changing setting.

17. The method of claim 1, wherein the associating a notification profile of a device with the defined event type is a default option.

18. The method of claim 17, wherein the default option is one of accepted, declined or overridden.

19. The method of claim 1, wherein the changing of the setting is performed automatically.

20. The method of claim 1, further comprising reverting the at least one notification profile to a default setting upon completion of the scheduled event type.

\* \* \* \* \*